United States Patent [19]

Mirhakimi et al.

[11] Patent Number: 5,347,857
[45] Date of Patent: Sep. 20, 1994

[54] PHASE DETECTION APPARATUS AND METHOD

[75] Inventors: Siamak Mirhakimi; Walter E. Earleson, both of Peoria; Eric W. Ohlson, Edelstein, all of Ill.

[73] Assignee: Caterpillar Inc., Peoria, Ill.

[21] Appl. No.: 859,530

[22] PCT Filed: Jun. 7, 1991

[86] PCT No.: PCT/US91/04009

§ 371 Date: Jun. 7, 1991

§ 102(e) Date: Jun. 7, 1991

[51] Int. Cl.$^5$ .......................................... G01M 15/00
[52] U.S. Cl. .................................................. 73/118.1
[58] Field of Search ................... 73/116, 117.3, 118.1, 73/862.31, 862.321, 862.325–862.328; 340/438, 441

[56] References Cited

U.S. PATENT DOCUMENTS

| | | | |
|---|---|---|---|
| 3,208,274 | 9/1965 | Rosaler | 73/862.327 |
| 3,589,178 | 6/1971 | Germann | 73/862.326 |
| 4,513,628 | 4/1985 | Kohama et al. | 73/862.34 |
| 4,602,515 | 7/1986 | Eichenlaub | 73/862.328 |
| 4,630,033 | 12/1986 | Baker | 340/347 |
| 4,783,998 | 11/1988 | Sander | 73/862.328 |
| 4,875,379 | 10/1989 | Rohs et al. | 73/862.327 |
| 5,067,355 | 11/1991 | Witte | 73/862.326 |

FOREIGN PATENT DOCUMENTS 2902815 8/1980 Fed. Rep. of Germany .

Primary Examiner—Robert Raevis
Attorney, Agent, or Firm—R. Carl Wilbur

[57] ABSTRACT

Machine assemblies often include driving and driven members such an engine associated with a driven load. These members typically include rotatable shafts (16, 18) interconnected by a flexible coupling element (20). System torsionals in such a machine often cause the shafts (16, 18) to be out of phase with one another. When this occurs, excessive energy is transferred to the coupling element (20). The subject apparatus (22) includes a device (24) for detecting and measuring rotational phase differences between driving and driven rotatable shafts (16, 18). The measured phase differences are compared with a reference phase difference level and an error signal is produced in response to the measured phase difference exceeding the reference level.

12 Claims, 4 Drawing Sheets

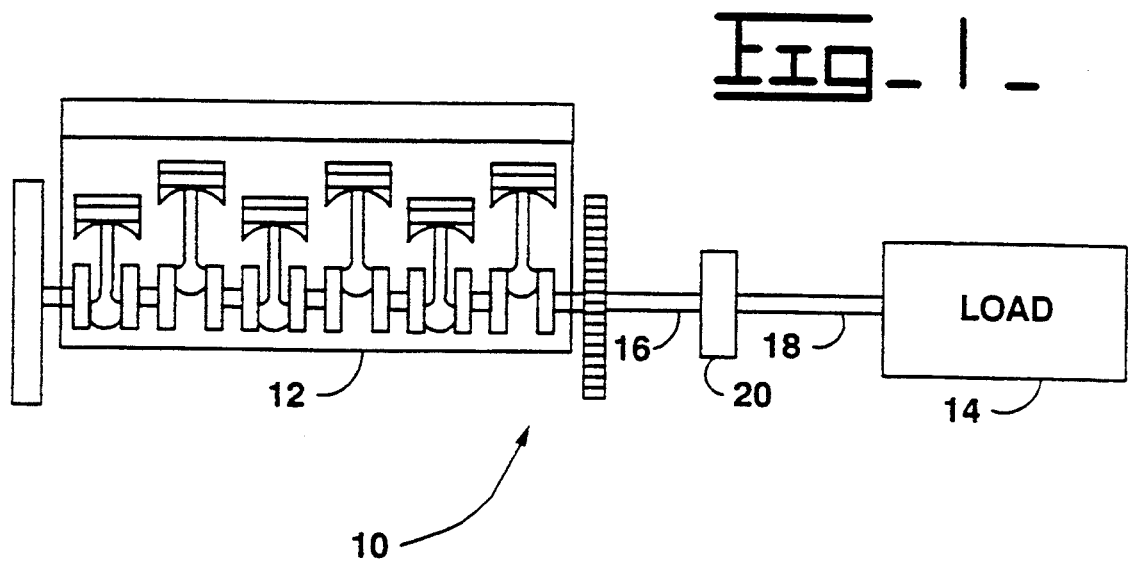
Fig_1_
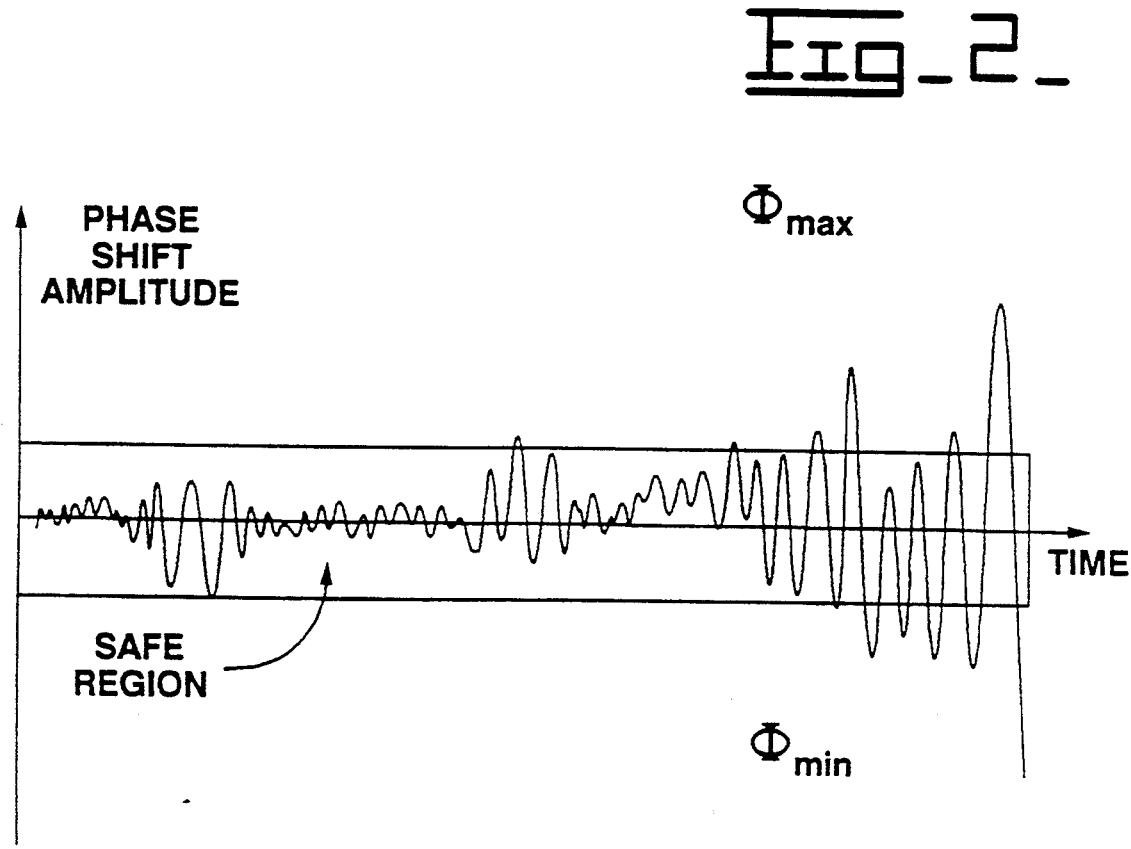
Fig_2_

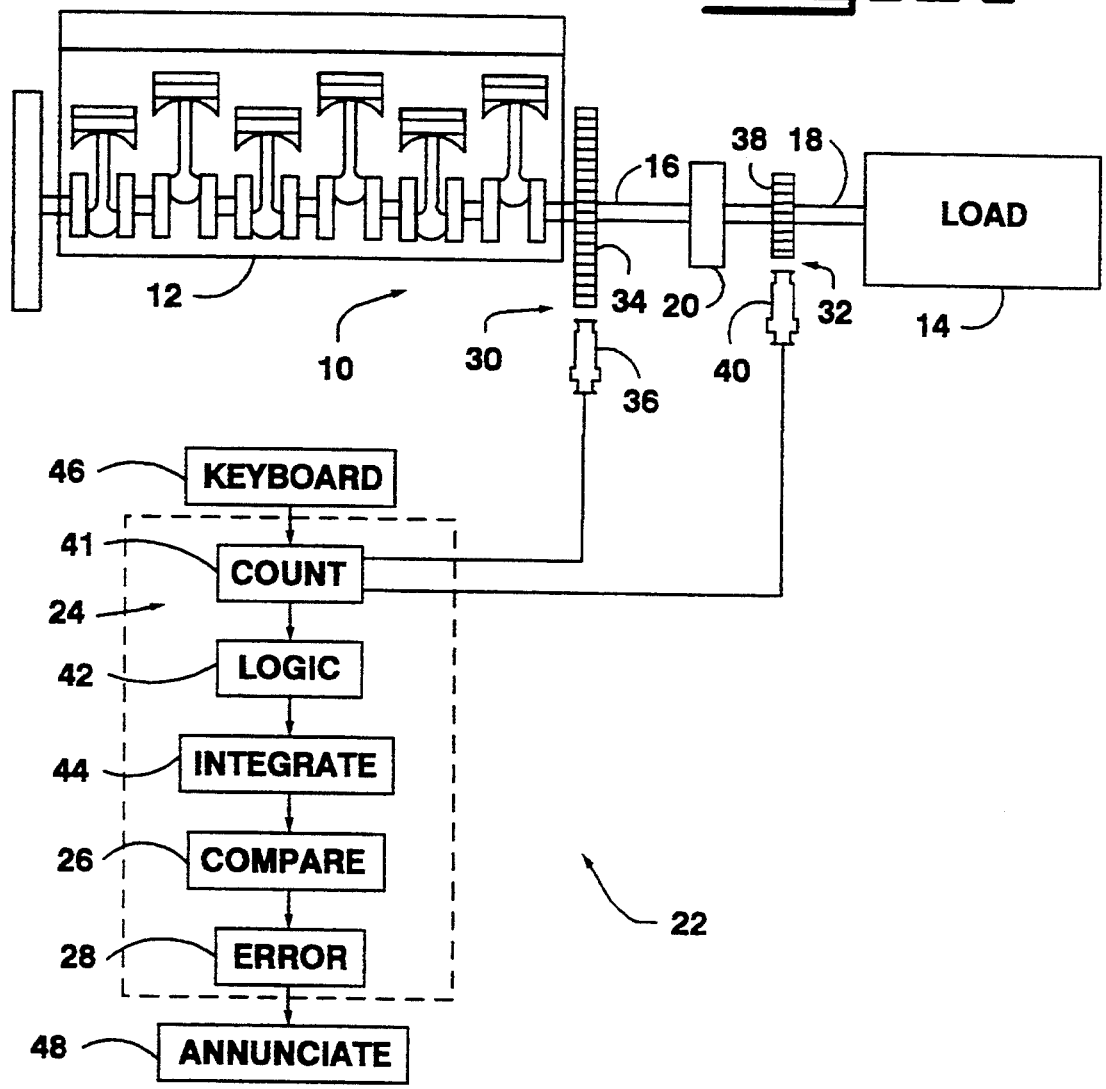
Fig_3_
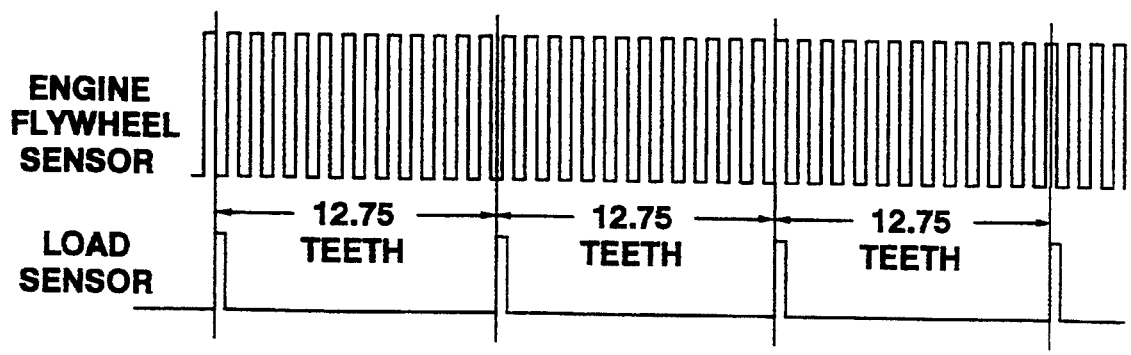
Fig_4_

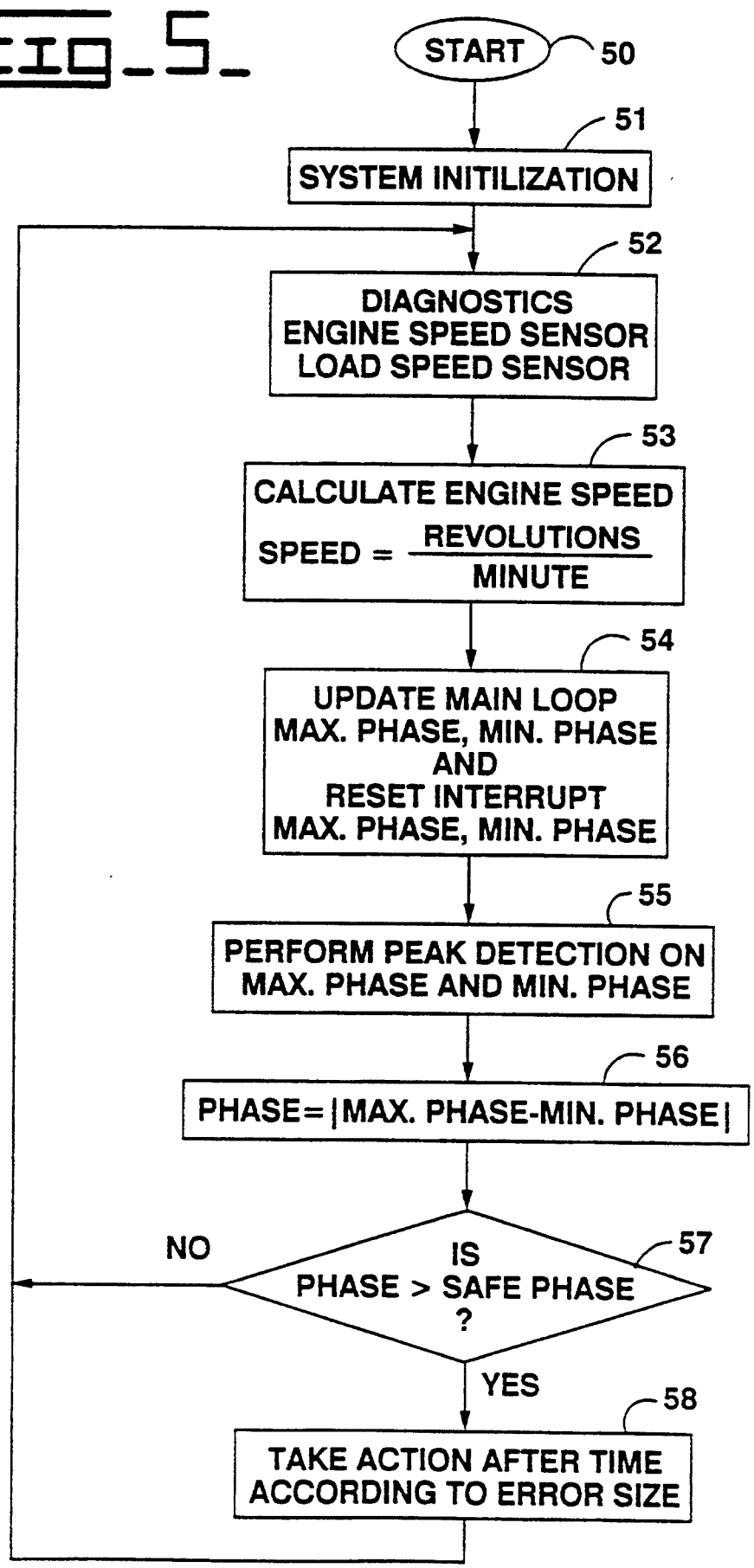

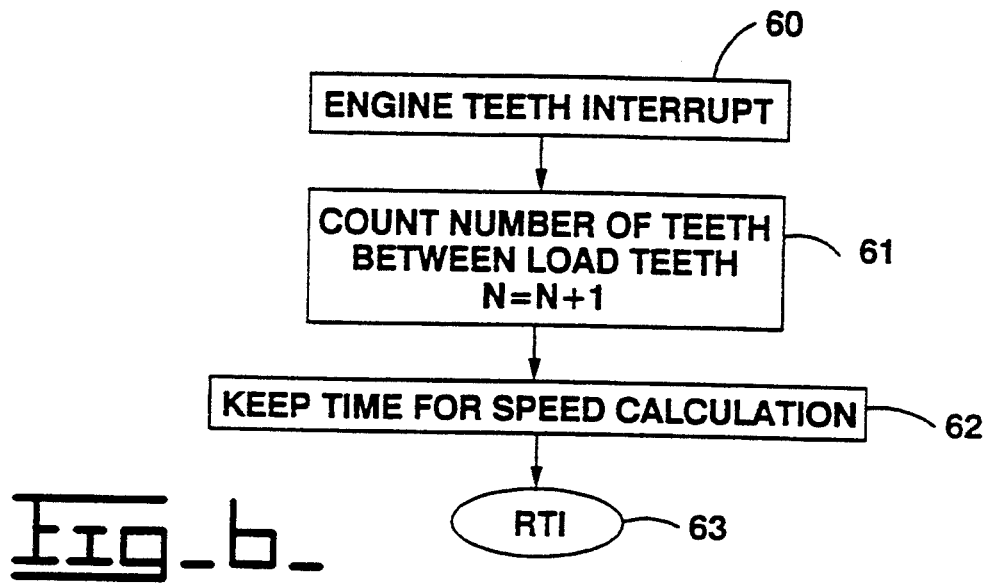
Fig_6_
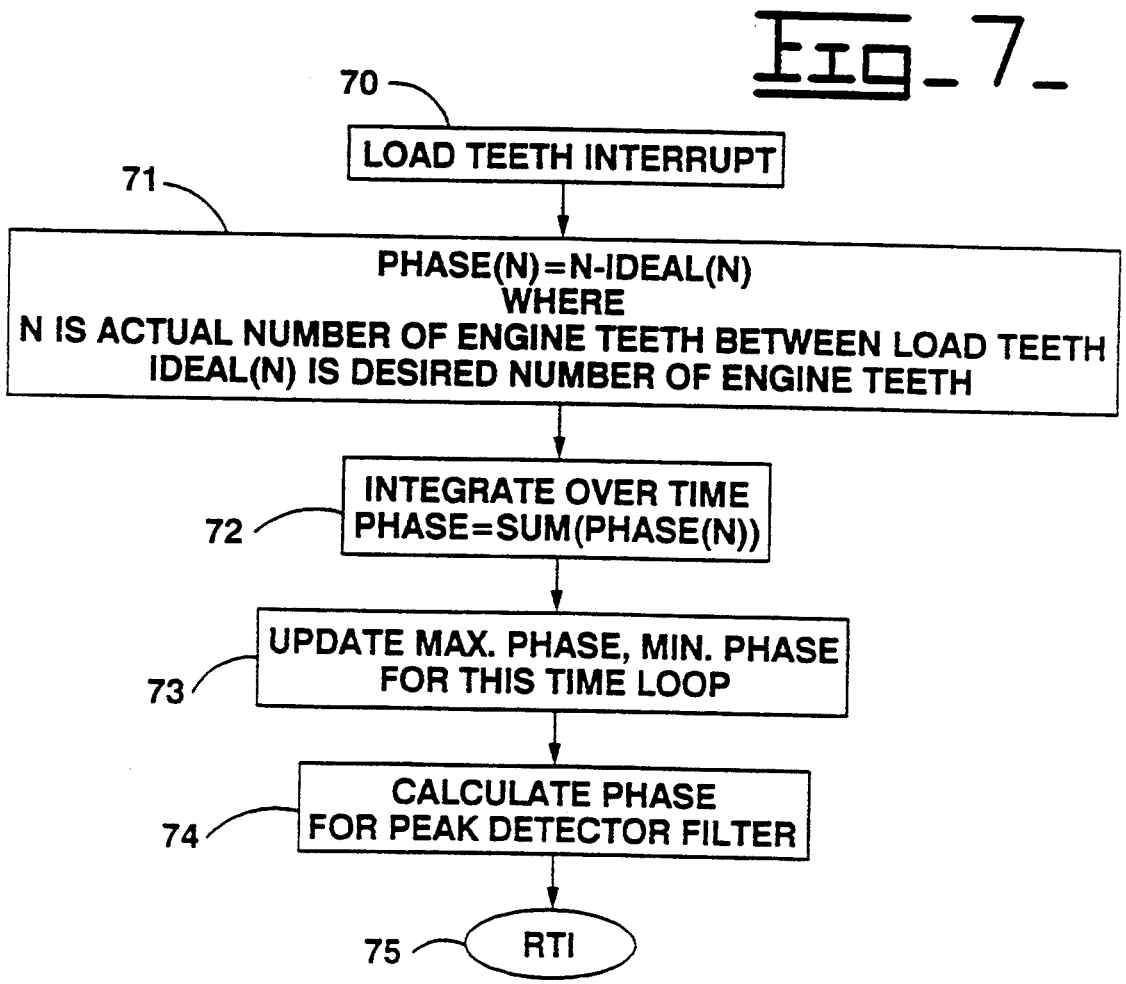
Fig_7_

PHASE DETECTION APPARATUS AND METHOD

DESCRIPTION

1. Technical Field

This invention relates generally to an apparatus and method for detecting and measuring the phase difference between two rotatable shafts, and more particularly, to an apparatus and method for controllably detecting and measuring the dynamic phase difference between a driving and driven rotatable shaft.

2. Background Art

It is frequently necessary to couple driving and driven members of a machine assembly to one another. The coupling element in such situations is generally flexible in order to account for slight misalignment between shafts. An exemplary instance of such a machine is a stationary reciprocating engine coupled to a torque converter, transmission, electric generator or the like. In such cases, the technique of utilizing a flexible coupler to connect the two rotating shafts provides efficient transmission of mechanical power while compensating for axial movement and angular misalignment of the shafts.

In such an arrangement, engine misfire, governor instability, or other disturbances can cause an increase in the dynamic deflection of the flexible coupler. These oscillations or torsionals between the engine and the externally mounted inertia of the load can cause failure of the flexible coupler when the amplitude of the oscillation becomes great enough.

While it is desirable to minimize the torsionals affecting the operation of a machine having driving and driven members, some oscillations cannot be eliminated. Things such as engine misfires, engine loading, torque reversals, engine start-up, etc. are bound to occur. Therefore, in order to prevent failure of the flexible coupler, it is desirable to sense an oscillating condition before the amplitude of the oscillations becomes great enough to cause failure. Once sensed, action can be taken to stop the engine or otherwise reduce the possibility that failure will occur.

The present invention is directed to overcoming one or more of the problems as set forth above.

DISCLOSURE OF THE INVENTION

In one aspect of the present invention, an apparatus associated with driving and driven members of a machine assembly is provided. Each member has an associated rotatable shaft, the shafts being interconnected by a coupling element. The rotational phase differences between the driving and driven rotatable shafts are detected and measured. These phase differences are compared with a reference phase difference and an error signal is produced in response to the measured phase difference exceeding the reference level.

In a second aspect of the present invention, a method for detecting phase differences is provided. An apparatus associated with driving and driven members of a machine assembly, each member having an associated rotatable shaft connected to another shaft by a coupling element, is provided. The method includes the steps of detecting and measuring rotational phase differences between the driving and driven shafts, comparing the measured phase differences with a reference phase difference level, and producing an error signal in response to the measured phase difference exceeding the reference level.

The present invention provides a phase detection apparatus and method that is both simple and accurate and that can determine and react to a phase difference that might be destructive to the coupling member.

BRIEF DESCRIPTION OF THE DRAWINGS

For a better understanding of the present invention, reference may be made to the accompanying drawings, in which:

FIG. 1 is a diagrammatic view of an engine having a gear toothed flywheel member attached by a flexible coupling to a load;

FIG. 2 is a graphical representation of the phase shift occurring between the engine shaft and the load shaft of an arrangement such as found in FIG. 1;

FIG. 3 is a block diagram embodiment of the present invention;

FIG. 4 is a graphical representation of the output of transducers associated with an embodiment of the present invention; and FIGS. 5 through 7 are functional flowcharts of computer software used with an embodiment of the present invention.

BEST MODE FOR CARRYING OUT THE INVENTION

Referring first to FIG. 1, a machine assembly includes a driving member 12 such as a reciprocating engine and a driven member 14 that can be any sort of load driven by the engine. Each of the members 12, 14 has an associated rotatable shaft 16, 18. The shafts 16, 18 are connected to one another via a coupling element 20.

Referring to FIG. 3, an apparatus 22 is associated with the machine assembly 10 and includes means 24 for detecting and measuring rotational phase differences between the driving and driven rotatable shafts 16, 18. The apparatus 22 also includes a means 26 for comparing the measured phase difference with a reference phase difference level and a means 28 for producing an error signal in response to the measured phase difference exceeding the reference phase difference level.

The means 24 for detecting and measuring phase differences includes a first transducer 30 associated with the driving member shaft 16 and a second transducer 32 associated with the driven member shaft 18. The first transducer 30 includes a multi-tooth gear 34 attached to the shaft 16 and a gear tooth detector 36 arranged and mounted adjacent the gear 34. In like manner, the second transducer 32 includes a multi-tooth gear 38 attached to the shaft 18 and a gear tooth detector 40 arranged and mounted adjacent the gear 38. The first and second transducers 30, 32 are adapted to sense the presence and absence of the associated gear teeth. In a preferred embodiment, the detectors 36, 40 are of the magneto-reluctance type. Each of the gear tooth detectors 36, 40 are connected to the apparatus 22. Also in the preferred embodiment, one of the multi-tooth gears 34, 38 includes substantially more teeth than the other gear 34, 38. For example, the gear 34 associated with the driving shaft 16 can be a flywheel associated with the engine and may contain substantially more teeth than does the gear 38 associated with the load shaft 18.

The means 24 also includes a counter 41 for counting the number of gear teeth passing each of the gear tooth detectors 36, 40. Under ideal conditions, i.e.; no phase shift, the number of driving gear teeth that will pass the associated detector 36 during the interval between two driven gear teeth passing the other detector 40 is determined by dividing the total number of driving gear teeth on the gear 34 by the number of driven gear teeth on the gear 38. In the presence of torsionals, some deviation from this ideal will occur. This is the instantaneous phase shift, and is calculated by the logic means 42 subtracting the actual number of driving gear teeth counted by the counter 41 during the interval between two driven gear teeth from the predetermined ideal number of driving gear teeth that should have passed during the same period.

The apparatus 22 includes integration means 44 for integrating the calculated instantaneous phase difference over time to produce a dynamic phase difference. In a preferred embodiment, the rate at which the means 28 for producing an error signal responds to a difference between a measured and referenced phase level is a function of the magnitude of the difference between the levels.

Referring now to FIG. 2, An exemplary time trace of the oscillations or phase shift found between the driving and driven shafts 16, 18 is graphically demonstrated. Some torsional phase shift should be expected and does no particular harm to the flexible coupling 20. The coupling 20 is designed to absorb a certain amount of energy produced by such torsionals and is not adversely affected. However, in the event that the torsionals become excessive, the flexible coupler 20 will be required to absorb more energy than it is designed for and failure can occur. In the typical case, due to the torsional speed and various other factors, the oscillations will become unstable and will rapidly increase in a sinusoidal fashion until the coupler 20 fails. This results in a loss of power to the load 14 with whatever undesirable effects that might entail. In addition the coupler itself is destroyed and must be replaced.

Referring to FIG. 4, the way in which the transducers 30, 32 provide signals to the logic means 42 is graphically demonstrated. In a typical arrangement, the gear 34 associated with the driving member shaft 16 has a large number of teeth, for example, 255. In the same system, the gear 38 associated with the load shaft 18 has, for example, 20 teeth. Therefore, each time the load shaft rotates through a rotational angle corresponding to two teeth of gear 38 passing the associated gear tooth sensor 40, 12.75 teeth of the gear 34 should pass the gear tooth sensor 36 associated with the engine shaft 16. If exactly this number of teeth do pass the sensor 36, the two shafts 16, 18 are perfectly synchronized and no phase shift exists. However, because torsionals almost always exist in a machine of this nature, the actual number of teeth associated with the gear 34 that pass the engine shaft sensor 36 will generally be a number different from the ideal of 12.75. This difference is used by the detecting and measuring means 24 to calculate the instantaneous phase shift as described above. This instantaneous phase shift value is integrated over time to determine the dynamic phase shift in the system. The apparatus 22 determines the minimum and maximum instantaneous phase shift and applies peak detection to these values at predetermined intervals, for example, every 20 milliseconds. The absolute difference between the minimum and maximum detected peaks is the instantaneous phase shift between the engine and the load. This instantaneous phase shift value is compared 26 to the safe region for phase shift as indicated, for example, by the amplitude range shown in FIG. 2. This safe region can vary according to the particular machine arrangement under discussion. In any event, the detecting and measuring means 24 also determines if the dynamic phase shift exceeds an acceptable limit. Because the dynamic phase shift is an integrated value of instantaneous phase shift, the detecting and measuring means 24 can verify whether the sum of the phase shifts over time have exceeded an acceptable limit. If so, an error signal is produced and appropriate action can be taken. Typically, the engine will be shut down or its speed modified.

Assuming that the apparatus 22 is implemented using a microcomputer, it is quite simple to tailor various aspects of the control strategy. For example, a keyboard 46 is shown in FIG. 3 and is used by an operator to influence the various control factors. The operator has the ability to program or store in the system the desired acceptable peak-to-peak phase shift range, the minimum required time before the apparatus 22 produces an error signal after detecting an out-of-range phase shift, the type of engine or driving device employed, and the type of flexible coupler used in the system. With appropriate modifications of the computer program, other factors can be preprogrammed and used in the control strategy.

In a preferred embodiment, peak-to-peak dynamic level torsionals of 1.4° to 1.9° degrees are considered acceptable maximum values. A response time between 8 and 60 seconds for generation of the error is acceptable. The number of teeth on the engine flywheel gear 34 can also be programmed into the system. The computer program can also be adjusted to perform error checking so that an operator cannot enter a parameter that is outside of the ranges that are normally acceptable for the situation under consideration. Also, various factors can be cross-checked by the computer against one another, such as the number of teeth typically found on a flywheel associated with a particular engine type, in order to make the apparatus 22 even more fail safe.

In the preferred embodiment, a programmed microprocessor is used as a control element. FIGS. 5–7 are flowcharts illustrating a computer software program for implementing the preferred embodiment of this invention. The program depicted in these flowcharts is particularly well adapted for use with the microcomputer and associated components described herein, although any suitable microcomputer may be utilized in practicing an embodiment of the present invention. These flowcharts constitute a complete and workable design of a software program and have been reduced to practice on the 68HC11 microprocessor manufactured by Motorola Corporation. The actual software program can be readily coded from the detailed flowcharts using the instructions that are associated with this microprocessor or may be coded with the instructions of any other suitable conventional microcomputer. The process of writing software code from flowcharts such as these is a mere mechanical step for one skilled in the art.

In the flowcharts, FIG. 5 represents a main loop in the phase detection apparatus, while FIGS. 6 and 7 represent interrupt routines 60, 70 associated with the gears 34, 38 and associated detectors 36, 40. Taken together, the two interrupt routines 60, 70 keep track of the number of engine gear teeth that pass the associated detector 36 during the interval 61 between any two load teeth passing the other detector 40. The difference 71 between the ideal and the actual number of engine teeth that pass during this interval represents the instantaneous phase shift level. This value is integrated 72 over time to determine the dynamic phase shift, and this value is used to update 73, 54 the maximum and minimum phase shift peak detect registers in the main loop program. The absolute value 56 of the peak detected phase shift is determined in the main loop and compared 57 with the reference phase shift value. If the detected value is less than the reference value no action is taken and the program continues to monitor the torsionals that are present. However, if the actual dynamic phase shift value exceeds the reference value and continues to do so for a predetermined period of time, the error signal 58 is produced. Also, the amount of time to produce the error signal can readily be made inversely proportional or otherwise responsive to the amount by which the dynamic phase shift exceeds the safe range. Therefore, in the event that oscillations become extreme and the amplitude of these oscillations is quite high, action to produce an error signal can be taken in a relatively short period of time as opposed to a situation where the actual dynamic phase shift exceeds the safe level by only a small amount. In either case, an error signal will be generated by the system in time to prevent damage to the flexible coupling member 20.

INDUSTRIAL APPLICABILITY

Operation of the apparatus 22 is evident in view of the foregoing discussion of the implementation of such a system using the flowcharts found in FIGS. 5-7. The user or operator of the apparatus must determine how much phase shift the coupler associated with a particular apparatus can reasonably accept and then simply keys the appropriate parameters into the microcomputer system. These parameters will include at least the configuration of the gears 34, 38 in terms of the number of teeth associated with each, the safe range of phase shift that the flexible coupler 20 can accommodate, and the time delay, if any, that the system will wait prior to providing an error signal.

Once the necessary information is stored in the memory of the computer system, control takes place in accordance with the flowcharts and other description found above. In the event that oscillations do occur and phase shift exists between the two rotating shafts 16, 18, the apparatus 22 will determine the instantaneous phase shift level, integrate this level over time to produce the dynamic phase shift level, and compare this actual dynamic phase shift level with the predetermined referenced level. In the event that the actual phase shift exceeds the reference value, appropriate error indications will occur.

The error signal produced by the apparatus 22 can be used to simply alert the user or operator of the error condition via an annunciator 48 of an appropriate design, or can be used to control the overall system. Annunciators that may be successfully employed with such a system include a level meter that indicates the actual phase shift level, or an analog of such a meter, such as a row of light emitting diodes or other visual indicators that show progressively how much phase shift is present in the system. Audio annunciators and other forms of signalling devices can also be readily employed in such a system as one skilled in the art would certainly appreciate. In addition, one skilled in the art would find it relatively simple to utilize such an error signal to drive an electronic or electromechanical device that controls the operation of the engine or other driving member 12. For example, a simple solenoid could be used to shut off the fuel or electrical supply to the engine causing the system to shut down. The actual control utilized is of no importance to the invention claimed.

Other aspects, objects, advantages, and usages of this invention can be discerned from a study of the drawings, the disclosure, and the appended claims.

We claim:

1. An apparatus (22), comprising: a driving member having a driving rotatable shaft connected therewith;
   a driven member having a driven rotatable shaft connected therewith;
   a coupling element interconnecting said driven and driving shafts;
   means (24) for detecting and measuring rotational phase differences between the driving and driven rotatable shafts (16, 18);
   means (26) for comparing said measured phase difference with a reference phase difference level;
   means (28) for producing an error signal in response to said measured phase difference exceeding said reference phase difference level;
   wherein said means for detecting said measuring phase differences includes a first transducer associated with said driving member shaft, and a second transducer associated with said driven member shaft;
   wherein said first and second transducers each include a multi-toothed gear and a gear tooth detector adapted to sense the presence and absence of the respective gear teeth;
   wherein one of said multi-toothed gears includes substantially more teeth than does the other of said multi-toothed gears.

2. An apparatus (22), as set forth in claim 1, wherein said means (24) for measuring phase differences counts the number of driving member gear teeth passing the respective gear tooth detector (36) during a measured period of time, and calculates the instantaneous phase difference by subtracting the number of driving member teeth counted from a predetermined expected number of gear teeth.

3. An apparatus (22), as set forth in claim 2, wherein said predetermined expected number of gear teeth is determined by dividing the number of driving member teeth by the number of driven member teeth.

4. An apparatus (22), as set forth in claim 2, wherein said measured period of time is the actual time elapsed between successive driven member gear teeth passing the respective gear tooth detector (40).

5. An apparatus (22), as set forth in claim 2, wherein said measuring means (24) integrates the calculated instantaneous phase difference and responsively determines the amount of dynamic phase difference.

6. An apparatus (22) for measuring the dynamic phase difference between the rotatable shafts (16, 18) of a reciprocating engine drivingly connectable by a flexible coupling element (20) to a load, comprising:
   means (24) for detecting rotational phase differences between the rotatable engine and load shafts (16, 18), including first and second transducers (30, 32) associated respectively with the engine and load shafts (16, 18), each of said transducers (30, 32) including a respective multi-toothed gear (34, 38) and gear tooth detector (36, 40); and
   means (24) for determining the amount of dynamic phase difference between the rotatable shafts (16, 18), by counting the number of driving member gear teeth passing the respective gear tooth detectors (36) during the interval between two successive ones of said driven member gear teeth passing the respective gear tooth detector (40), calculating the instantaneous phase difference between the rotatable shafts (16, 18) by subtracting the actual number of driving member gear teeth counted from the expected number obtained by dividing the number of driving member gear teeth by the number of driven member gear teeth, and integrating the calculated instantaneous phase difference and responsively determining the amount of dynamic phase difference.

7. An apparatus (22), as set forth in claim 6, including means (26) for comparing the dynamic phase difference with a reference phase difference level, and means (28) for producing an error signal in response to said dynamic phase difference exceeding said reference phase difference level by a predetermined amount.

8. An apparatus (22), as set forth in claim 7, wherein the rate at which the means (28) for producing an error signal responds to a difference between the measured and reference phase levels is a function of the magnitude of the difference between the levels.

9. An apparatus (22), as set forth in claim 6, wherein one of said multi-toothed gears (34, 38) includes substantially more teeth than the other of said gears (34, 38).

10. A method for measuring the dynamic phase difference between the rotatable shafts (16, 18) of an engine drivingly connectable by a coupling element (20) to a load, each of the rotatable shafts (16, 18) including a transducer (30, 32) having respective multi-toothed gears (34, 38) and gear tooth detectors (36, 40), comprising the steps of:

detecting rotational phase differences between the rotatable engine and load shafts (16, 18);

calculating the instantaneous phase difference between the rotatable shafts (16, 18) by subtracting the number of driving member gear teeth counted from a predetermined expected number of teeth; and integrating the calculated instantaneous phase difference and responsively determining the amount of dynamic phase difference.

11. A method, as set forth in claim 10, including the steps of comparing the dynamic phase difference with a reference phase difference level, and producing an error signal in response to said dynamic phase difference exceeding said reference phase difference level by a predetermined amount.

12. A method, as set forth in claim 10, wherein said step of detecting includes the step of counting the number of gear teeth passing said driving member gear tooth detector (36) during a measured period of time.

* * * * *